United States Patent [19]

Piper

[11] 4,097,916
[45] Jun. 27, 1978

[54] ELECTROLYTIC CAPACITOR LEAD TERMINAL CONFIGURATION

[75] Inventor: John Piper, Greenville, S.C.
[73] Assignee: Union Carbide Corporation, New York, N.Y.
[21] Appl. No.: 700,589
[22] Filed: Jun. 28, 1976
[51] Int. Cl.$^2$ ............................................. H01G 9/00
[52] U.S. Cl. .................................................... 361/433
[58] Field of Search .................... 317/230; 339/185 R; 361/433, 434, 306

[56] References Cited

U.S. PATENT DOCUMENTS

| 3,806,770 | 4/1974 | Voyles et al. | 317/230 |
| 3,957,333 | 5/1976 | Kaminski | 339/185 R X |

OTHER PUBLICATIONS

B. E. Hart, "Low-Inductance Capacitor," IBM Technical Disclosure Bulletin, vol. 9, No. 12, May 1967, p. 1738.

Primary Examiner—Stanley D. Miller, Jr.
Assistant Examiner—James W. Davie
Attorney, Agent, or Firm—Frederick J. McCarthy, Jr.

[57] ABSTRACT

A polar, solid electrolytic capacitor device having a pair of relatively closely spaced adjacent terminal leads of one polarity and another pair of terminal leads of the other polarity located one on each side of the first lead pair, all of the terminal leads lying in a common plane and being substantially parallel to each other.

1 Claim, 12 Drawing Figures

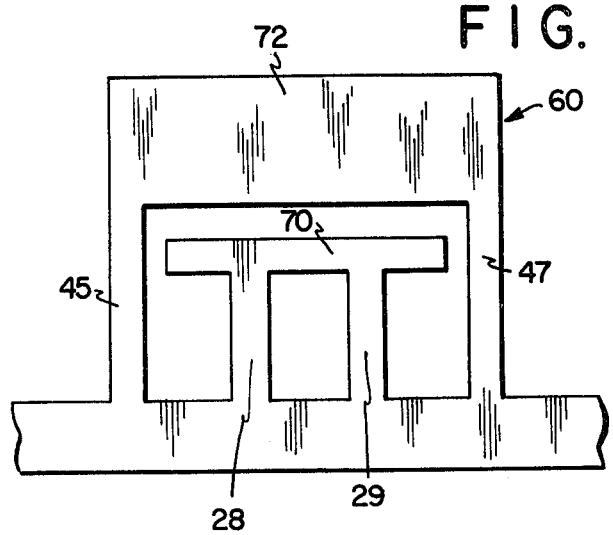
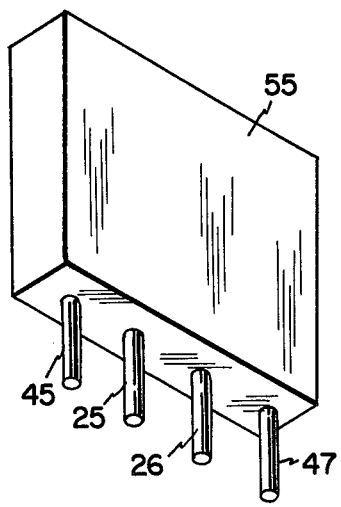
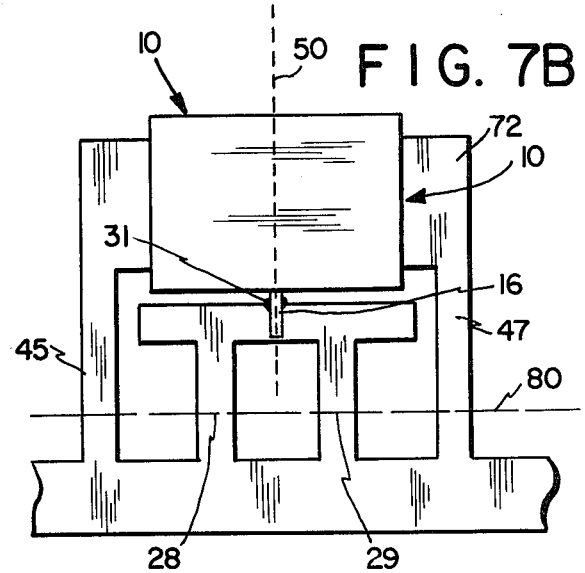
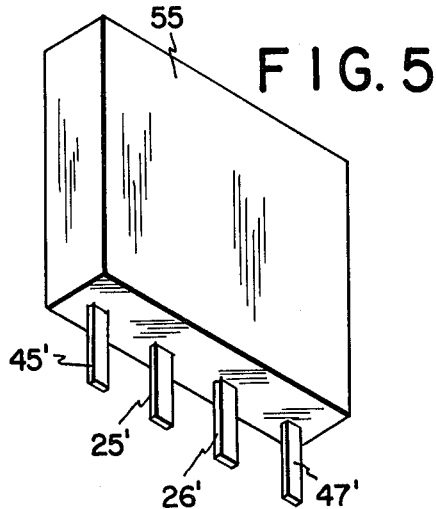
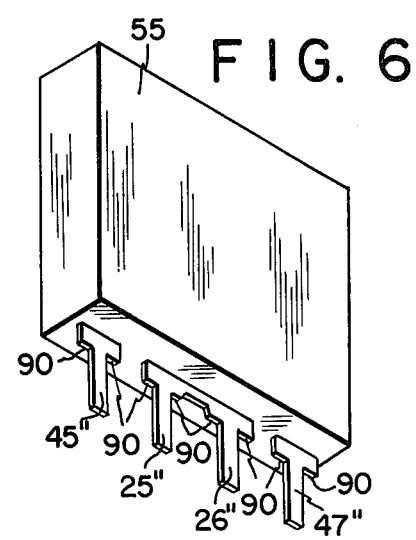

ELECTROLYTIC CAPACITOR LEAD TERMINAL CONFIGURATION

The present invention is directed to a capacitance device and more particularly to a polar, solid electrolyte capacitor device constructed from a porous valve-metal anode. The term "valve metal" as used herein means a metal which forms an insulating oxide coating on its surface, for example, tantalum, aluminum, niobium and titanium. For the purpose of clarity and not for the purpose of limitation, the concepts of this invention will be discussed in relation to a solid tantalum capacitor.

Solid electrolytic tantalum capacitors of the type disclosed in U.S. Pat. No. 3,166,693 are widely used in the electronics industry because of their high volumetric efficiency, solid state construction, and general stability. Such capacitors are particularly useful in the computer industry because of the above and other advantages.

However, solid electrolytic tantalum capacitors are polar devices, i.e., they have distinct positive and negative terminals and, if connected to a circuit with incorrect polarity, the capacitors usually fail catastrophically with the possibility of heat damage to associated components.

It is accordingly an object of the present invention to provide a solid electrolytic capacitance device which is not vulnerable to reverse circuit connection and which has other advantages as hereinafter described.

Other objects will be apparent from the following description and claims taken in conjunction with the drawings wherein FIG. 1(A) shows a partial fragmented view of a conventional solid tantalum electrolytic capacitor.

FIGS. 4, 5 and 6 show encapsulated capacitance devices in accordance with the present invention.

Figure 8:
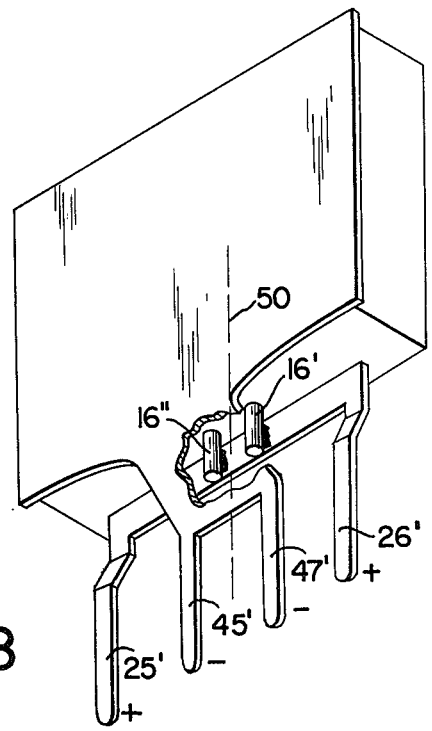

FIGS. 7(A), 7(B) and 7(C) illustrate one method of assembling a capacitance device in accordance with the present invention, and FIG. 8 shows an embodiment of the present invention wherein the terminal arrangement establishes a different polarity arrangement from that of the device of FIG. 1.

A capacitance device in accordance with the present invention comprises a valve metal anode body having at least one riser wire extending therefrom or other means of making electrical contact to the body and having a dielectric oxide film, an electrolyte layer of manganese dioxide or other semiconducting material, a conductive counterelectrode coating covering a major portion of the electrolyte layer, a first pair of relatively closely spaced and adjacent terminal leads and a second pair of terminal leads spaced further apart than said first pair of terminal leads, all of said terminal leads having end portions remote from said anode body, the end portions of each pair being disposed substantially symmetrically about an axis lying between the first pair of terminal leads, the axis and the end portions of both pairs of terminal leads being parallel and lying in the same plane, one of said pair of terminal leads being connected to said counterelectrode coating of said anode body and the other said pair of terminal leads being connected to said riser wires or other means of contacting the valve metal body.

Figure 1A:
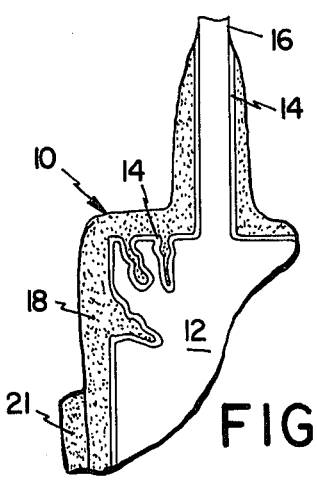
FIG. 1(B) shows an elevation view of a solid tantalum capacitor in accordance with the present invention.
FIG. 1(C) shows a perspective view of the capacitor of FIG. 1(B) and a portion of a circuit board adapted to receive the capacitor.

The present invention will be more clearly understood with reference to the drawing wherein FIG. 1(A) shows a partial fragmented view of a conventional solid porous tantalum porous anode 10 e.g., formed of tantalum or other known valve metal, wherein the sintered tantalum body is indicated at 12, dielectric oxide, e.g., tantalum oxide at 14 and a riser wire e.g., tantalum, at 16 for making electrical contact with the anode body. A manganese dioxide electrolyte layer is shown at 18. Solid valve metal anodes of the type shown in FIG. 1(A) are provided with conventional electrically conductive counterelectrode cathode coatings, e.g., carbon, copper or silver and solder which are indicated at 21 in FIGS. 1(B) and 1(C).

Figure 1B:
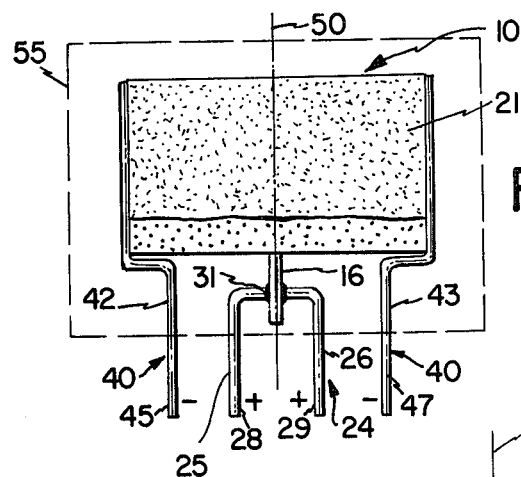
Figure 1C:
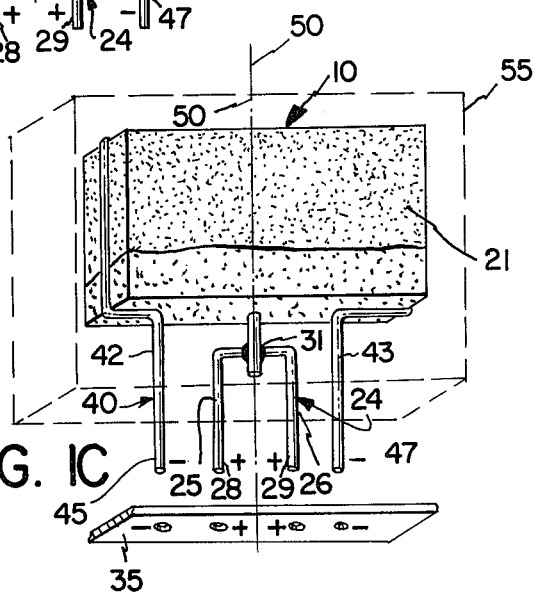

With reference to FIGS. 1(B) and 1(C), a pair of terminal leads 24 formed of relatively closely spaced adjacent conductors 25, 26 and having end portions 28, 29 are connected to tantalum riser 16, e.g., by welding as indicated at 31. End portions 28, 29 of lead pair 24 constitute the positive or anode terminals of the capacitance device illustrated and in use are inserted into a circuit board 35, shown schematically in FIG. 1(C), for ultimate connection in an electric circuit having the polarities indicated in FIG. 1(C).

An additional pair of terminal leads 40 formed of conductors 42, 43 and having end portions 45, 47 are connected to counterelectrode coating 21, e.g., by soldering. End portions 45, 47 of terminal lead pair 40 constitute the negative or cathode terminals of the capacitance device illustrated and in use are inserted into circuit board 35, shown in FIG. 1(C), for ultimate connection in an electric circuit having the polarities indicated in FIG. 1(C). As can be seen from FIGS. 1(B) and 1(C) terminal end portions 45, 47, 28, 29 are substantially parallel to each other and to axis 50. Further, the terminal end portions 45, 47, 28, 29 lie substantially in the same plane and are substantially symmetric about axis 50. In a preferred embodiment the capacitor is encapsulated with an insulating material 55 in FIGS. 1(B) and 1(C), e.g., epoxy, which is conventionally applied to enclose the capacitor body. The above-described capacitance device is not vulnerable to reverse insertion into circuit boards and permits the convenient use of large surface area, flat sided, slab shaped anodes of the type shown in FIGS. 1(B) and 1(C) which are known to improve the effective series resistance properties of a capacitor, e.g., as described in U.S. Pat. Nos. 3,345,545 and 3,686,535. Also, the use of multiple terminal leads 25, 26, 45, 47 reduces the series inductance of the capacitance device as described in U.S. Pat. Nos. 3,806,770 and 3,686,535. The capacitance devices of the present invention can be readily encapsulated using simple 2-part molds and can be assembled using "lead frame" construction techniques as hereinafter described.

Clearly lead pairs 45, 47, and 28, 29 can each be made from a single piece of metal, e.g., a wire bent into a "U" shape or from two pieces of metal each joined to the capacitor body separately. It is important, however, that electric continuity exist with each lead pair in the finished device.

Figure 2:
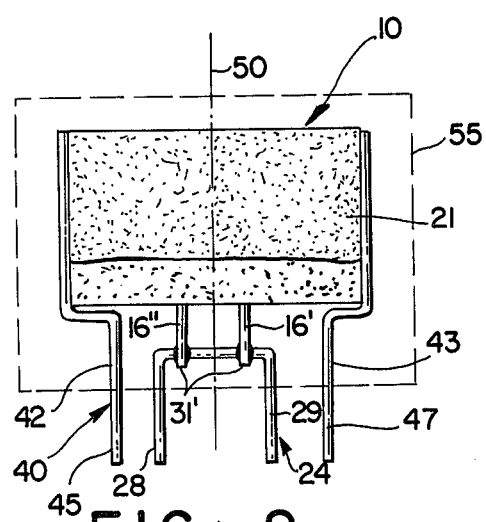
FIGS. 2 and 3 show further embodiments of capacitance devices in accordance with the present invention.

With reference to FIG. 2, the device therein illustrated is similar to that of FIG. 1 except that the tantalum anode body 10 is provided with a plurality of riser wires, 16', or 16" which are conveniently attachable to terminal lead pair 24 and reduce the series inductance of the capacitor device.

Figure 3:
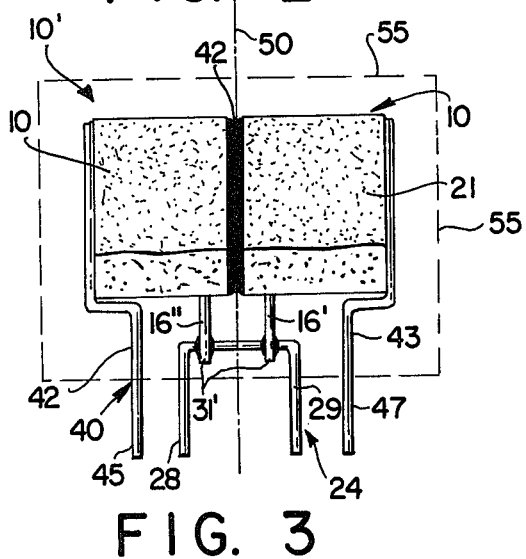

In FIG. 3, the anode body 10' comprises a plurality of individual anode bodies 10 which are arranged adjacently and joined, e.g., by solder, as indicated at 42.

FIGS. 4 through 6 show encapsulated devices having differently shaped terminal lead end portions; in FIG. 4, wire shapes are shown while in FIGS. 5 and 6 the flat terminal lead end portions result from "lead frame" construction as hereinafter described. The equi-level transverse portions 90 of the end portions shown in FIG. 6 provide a "standoff" for the capacitance device shown.

FIGS. 7(A) and 7(B) illustrate the use of lead frame techniques in connection with the present invention. FIG. 7(A) shows at 60 a portion of a metal strip which has been die punched to provide the configuration illustrated which is joined to the slab-shaped capacitor body 10 as shown in FIGS. 7(B) and 7(C), e.g., by welding as indicated at 31 and 32. After cutting along line 80 indicated in FIG. 7(B), the resulting capacitive device can be encapsulated to provide a device such as is shown in FIG. 5.

FIG. 8 shows a further embodiment of the present invention wherein the anode terminal lead end portions 25' and 26' are spaced further apart than the cathode terminal lead end portions 45' and 47'. The specific polarity provided at the terminal lead end portions is different from that of FIG. 1(B), but has the same symmetry about an axis 50, i.e., first polarity, second polarity, second polarity, first polarity, and is not vulnerable to "reverse" circuit insertion.

What is claimed is:

1. A polar capacitive device comprising a porous valve-metal anode body having (i) a dielectric oxide film formed thereon, (ii) a solid electrolyte layer over the dielectric oxide film, (iii) a conductive counterelectrode covering a major portion of the exterior surface of the anode body, a first pair of relatively closely spaced and adjacent terminal leads and a second pair of terminal leads spaced further apart than said first pair of terminal leads, all of said terminal leads having end portions remote from said anode body, the end portions of each pair being symmetric about an axis lying between the first pair of terminal leads, the axis and the end portions of both pairs of terminal leads being parallel and lying in the same plane and extending in the same direction, one of said pair of terminal leads being connected electrically to said counterelectrode coating on said anode body and the other said pair of terminal leads being connected electrically to the valve-metal anode body such that the order of polarity of the terminal leads is $P_1$-$P_2$-$P_2$-$P_1$ where $P_1$ and $P_2$ represent opposite polarities.

* * * * *